United States Patent [19]
Singh et al.

[11] Patent Number: 5,725,313
[45] Date of Patent: Mar. 10, 1998

[54] ROLLING CUTTER DRILL BITS

[75] Inventors: Ranjit Kumar Singh, Singapore, Singapore; Michael Scott Nixon, Houston; Jeffery Edward Daly, Cypress, both of Tex.

[73] Assignee: Camco International Inc., Houston, Tex.

[21] Appl. No.: 506,993

[22] Filed: Jul. 28, 1995

[30] Foreign Application Priority Data

Aug. 3, 1994 [GB] United Kingdom ............... 9415668

[51] Int. Cl.⁶ .................................... F16C 17/04
[52] U.S. Cl. ................................ 384/93; 384/92
[58] Field of Search ...................... 384/92, 93, 94, 384/95, 96, 912, 913

[56] References Cited

U.S. PATENT DOCUMENTS

| | | |
|---|---|---|
| 3,235,316 | 2/1966 | Whanger . |
| 3,384,426 | 5/1968 | Schumacher . |
| 3,720,274 | 3/1973 | McCallum . |
| 3,721,307 | 3/1973 | Mayo . |
| 4,074,922 | 2/1978 | Murdoch . |
| 4,323,284 | 4/1982 | Childers et al. . |
| 4,410,284 | 10/1983 | Herrick . |
| 4,413,918 | 11/1983 | Thomas . |
| 4,439,050 | 3/1984 | Garner . |
| 4,641,976 | 2/1987 | Kon . |
| 5,161,898 | 11/1992 | Drake . |

OTHER PUBLICATIONS

"Metal Handbook" (9th Edition, vol. 3) pp. 257-268 and 589-591.

Primary Examiner—Lenard A. Footland
Attorney, Agent, or Firm—Fletcher & Associates

[57] ABSTRACT

A rolling cutter drill bit comprises a body and three legs, each leg having a cantilevered bearing spindle, a rolling cutter rotatably mounted on the bearing spindle, lubricant delivering means within the bearing spindle, and a floating thrust bearing element configured to carry onward thrust loads from the rolling cutter onto the bearing spindle. Each floating thrust bearing element is formed of a wrought alloy material consisting primarily of chromium carbide and cobalt and having a yield strength of less than 120,000 psi and a ductility of at least 4%, both at room temperature.

27 Claims, 1 Drawing Sheet

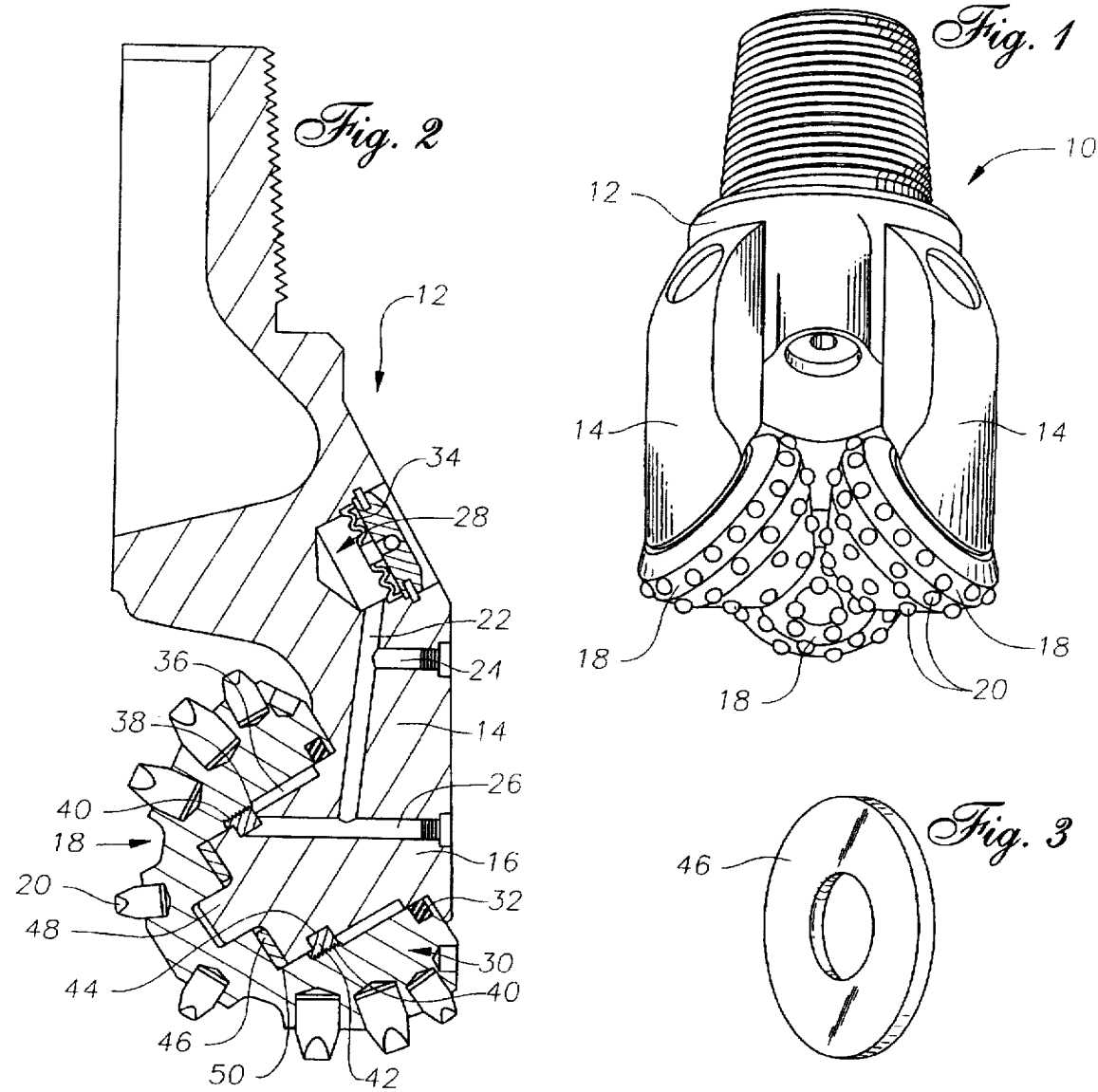

ROLLING CUTTER DRILL BITS

BACKGROUND OF THE INVENTION

1. Field of the Invention

The present invention relates to the art of earth boring with rolling cutter drill bits. In particular, this invention relates to an improved thrust bearing for sealed and lubricated three cone earth boring bits utilized for gas and oil well drilling.

2. Description of Related Art

Sealed and lubricated rolling cutter drill bits (also called rock bits) typically have three different bearing structures in each cutter. The first bearing structure is designed to support cantilevered radial loads and is typically a journal bearing or a roller bearing. The second bearing structure is designed to retain the rolling cutter upon the cantilevered bearing spindle when the cutter is subjected to offward thrust. This retention system is generally comprised of either ball bearings or a friction bearing such as a snap ring or a threaded retaining ring. The third bearing structure is designed to carry onward axial thrust loads and is most often a friction type bearing. This thrust bearing in rolling cutter drill bits is the object of the present invention.

Analysis of used rolling cutter drilling bits shows that when high loads are combined with high rpm, the thrust being often fails or the resulting heat buildup causes degradation of the other bearings. Even though a great many designs and materials for rock bit thrust bearings have been used in an attempt to solve this problem, thrust bearing damage still remains a source of bearing failure, especially at very high rpm.

Friction thrust bearing elements in drill bits can be categorized as either fixed or floating bearing elements. Fixed elements are most often welded inlays or interference fitted inserts in the rolling cutter or in the end of the cantilevered bearing spindle. The most commonly used inlay is a STELLITE (registered trade mark) material welded on the thrust surface of the cantilevered bearing spindle. Another inlay features alternating surface areas of load beating and anti-galling materials on the thrust surfaces as shown in U.S. Pat. Nos. 3,235,316 and 4,323,284. Alternately, a tungsten carbide button can be pressed into the cutter as shown in U.S. Pat. No. 3,384,426 or an irregularly shaped disk can be captured in the cutter as shown in U.S. Pat. No. 4,413,918. These materials must be fixed into the rolling cutter or the cantilevered bearing spindle because they lack either strength or ductility or both. For instance, the welded STELLITE and tungsten carbide inserts have less than 1% ductility. If they were not supported by the spindle substrate they would soon disintegrate in service. The ductile inlays have such low hardnesses and yield strengths they would soon wear and/or deform excessively inservice.

Drill bit performance in increasingly limited by thrust bearing capability as modern drilling applications demand ever higher loads and speeds. Degradation of thrust bearing surfaces via wear, spalling deformation, and fracture is primarily due to overheating. Significant decreases in both tribological and design strength properties with temperatures are well known to directly cause current materials systems failures.

Floating intermediate thrust bearing elements for drill bits are shown in U.S. Pat. Nos. 3,720,274; 4,410,284; 4,439,050 and 5,161,898. These floating thrust bearing elements have advantages over fixed elements well known and practiced in the prior art.

As shown in U.S. Pat. Nos. 4,439,050 and 5,161,898 and implied in several of the other Patents cited above, floating bearing assemblies can be designed as one or more fixed bearing elements mounted or fused on carriers. The entire assembly functions as a single floating bearing element. These designs are not only more expensive to manufacture and occupy more bearing space than unitary material floating bearing elements in drill bits, they are also not as effective under extreme loads. This is because the being material can become separated from the carrier and contaminate the other bearing systems.

The magnitude of temperatures reached in the floating thrust elements of drill bits has been generally under-stated in the prior art. Floating thrust bearing elements in drill bits do not transfer heat into the external environment as easily as the cantilevered bearing spindle or the rolling cutter. Consequently, during a peak load event, the surface temperature of the thrust element will increase preferentially over its mating surfaces within the drill bit. After the load event, the heat will transfer relatively slowly from the thrust element through the mating surfaces and into the surrounding environment. The peak operating surface temperatures at the asperities of the floating thrust element can become extremely high, and in fact can exceed 1500° F., leading to failure.

To function successfully in a drill bit, a unitary floating bearing element must have acceptable yield strength and ductility at operating temperature. In U.S. Pat. Nos. 3,721,307; 4,641,976 and 5,161,898, the minimum yield strength for a successful floating bearing element material in a drill bit is established at 140,000 psi and the minimum ductility is established to be about 1% to 4%. The Beryllium Copper of U.S. Pat. No. 3,721,307 is still in common use in drill bits, and is specified in ASTM B643-92, temper TH04 (HT). The minimum yield strength of this material is indicated in that specification to be from 140,000 psi to 155,000 psi. The copper based spinodal material of U.S. Pat. No. 4,641,976 with an ultimate tensile strength of 180,000 psi typically has a minimum yield strength of from 145,000 psi to 160,000 psi. Quoting U.S. Pat. No. 5,161,898 (Col. 1, line 47), ". . . materials having minimum yield strengths of about 140,000 psi are needed to avoid macroscopic plastic deformation in service." It is understood that all these yield strength values are at room temperature. It is apparent in the prior art that 140,000 psi is common as the minimum room temperature yield strength for floating bearing elements in drill bits.

The copper based alloys of U.S. Pat. Nos. 3,721,307 and 4,641,976 mentioned above have a weakness, however. When the operating temperatures reach about 600° F. their strength greatly decreases. Generally, yield strengths of these copper alloys approach zero psi at 1500° F.

Historically, failure analysis of drill bit bearings has led bit designers to develop bearing materials with ever higher yield strengths. However, these materials probably performed better not because their room temperature yield strengths were higher, but because raising the room temperature yield strength tended to increase the operating temperature yield strengths. This success, coupled with the ease of measurement at room temperature, has led to a search for materials having high yield strength and good ductility at room temperature. Little attention has been given to materials with lower room temperature yield strength, but relatively high yield strength at operating temperature.

SUMMARY OF THE PRESENT INVENTION

The present invention is directed at a new floating thrust washer bearing element for rock bits formed of a material selected from the class of materials formed primarily of cobalt and chromium carbide and known as wrought, ductile STELLITES. The room temperature yield strength of these materials is less than 120,000 psi, much lower than what is shown in the prior art as necessary for a floating thrust bearing of a drill bit, making them an unexpected material choice for a floating thrust bearing. One material of this class is Aerospace Material Specification AMS 5894, a cobalt based, wrought super alloy commercially available by the trade name STELLITE, grade 6B, from Del Oro Stellite, Ontario, Canada. Floating thrust washers made from this STELLITE material with a room temperature yield strength averaging 105,000 psi have been successfully field tested in multiple drilling environments. Under moderate drilling loads and rotary speeds, the washers exhibited good physical condition and minimal wear, similar to previous thrust bearing systems. Extensive testing under more severe loads and speeds demonstrated that the ductile STELLITE was a superior material for floating thrust bearings in rock bits.

It is an object of this invention to provide a sealed and lubricated rolling cutter drill bit with a floating bearing element made of ductile STELLITE having a room temperature tensile elongation greater than 4% and a room temperature yield strength less than 120,000 psi.

It is a further object of this invention to provide a sealed and lubricated rolling cutter drill bit with a floating thrust bearing element made of ductile STELLITE with a room temperature yield strength less than 120,000 psi, said material further having a yield strength greater than 30,000 psi, an un-notched longitudinal Charpy impact toughness of greater than 120 ft-lbs., and a tensile elongation greater than 10%, all at 1500 degrees F.

It is a still further object of this invention to provide a sealed and lubricated rolling cutter drill bit with a floating thrust bearing element made of a ductile, wrought STELLITE material.

It is a still further object of this invention to provide a sealed and lubricated rolling cutter drill bit with a floating thrust bearing element made of a ductile, wrought STELLITE with a room temperature yield strength less than 120,000 psi, and coated with a soft, metallic solid lubricant.

BRIEF DESCRIPTION OF THE DRAWINGS

FIG. 1 is a perspective view of a rolling cutter bit of the present invention.

FIG. 2 is a cross sectional view of the preferred embodiment of an earth boring bit of the present invention showing the general arrangement of the lubrication and bearing systems.

FIG. 3 is a perspective view of a thrust washer of the present invention.

DETAILED DESCRIPTION OF THE PREFERRED EMBODIMENTS

Referring now to the drawings in more detail, and particularly to FIGS. 1 and 2, a rolling cutter drill bit 10 includes a body 12 (portions of which are not shown). The body 12 of a typical rolling cutter drill bit comprises three similar leg portions 14 (only two are shown). A cantilevered bearing spindle 16 formed on each leg 14 extends inwardly and downwardly. A rolling cutter 18 is rotatably mounted upon the spindle 16 as hereinafter explained. Attached to the rolling cutter 18 are cutting inserts 20 which engage the earth to effect a drilling action and cause rotation of the rolling cutter 18.

Typically, each cutting insert 20 will be formed of a hard, wear resistant material. Internal passageways 22, 24, & 26, as well as a reservoir 28 and bearing area 30 of the leg 14, are filled with lubricant (not shown) during bit assembly. The lubricant helps reduce bearing friction and wear during bit operation and is retained within the cutter 18 by a dynamic seal 32. Pressure differentials between the lubricant and the external environment of the bit are equalized by the movement of a pressure balancing diaphragm 34.

The cutter 18 is mounted upon the cantilevered bearing spindle 16 formed on the leg 14. A sliding bearing member 36 is mounted between the spindle 16 and a mating bearing cavity 38 formed in the cutter 18. This bearing 36 is designed to carry the radial loads imposed upon the cutter 18 during drilling. A second bearing member 42 is configured as a split threaded ring which engages internal threads 40 in the bearing cavity 38 of the cutter. This second bearing member 42 serves to retain the cutter 18 upon the bearing spindle by resisting the forces which tend to push the cutter 18 inward during drilling.

A third bearing member 46 is disposed between the bearing spindle 16 and the cutter 18. This bearing member 46 carries the onward thrust forces imposed upon the cutter 18 during drilling, and is hereinafter referred to as a thrust washer. In operation this thrust washer floats in the space between the bearing spindle 16 and the cutter 18.

This thrust washer 46 must withstand the impact loading present in rock bits during severe service at all temperatures. The thrust washer 46 must also have very high hot hardness, toughness, good ductility and the ability to resist wear in the presence of abrasives. At room temperature, the thrust washer 46 material may have a minimum yield strength of around 80,000 psi, good impact strength, a ductility of at least 4%, and good abrasion resistance. The thrust washer 46 is formed of a ductile STELLITE material with these properties which make it a superior rock bit floating thrust bearing.

A further property of ductile STELLITES is their reaction to wear particles. Because ductile STELLITES tend to have extremely large and hard chromium carbide precipitates in a ductile cobalt matrix, they have the ability to entrain wear particles in the matrix. Silica particles up to 0.001" diameter have been found embedded in the ductile cobalt matrix of thrust washers 46 of this invention from bits tested in field drilling operations. The silica particles were fine drilled solids from the wellbore which entered the bearing area 30 past the seal 32. The ability to entrain these wear particles may be beneficial when drill bits are operating in an abrasive environment.

In one the preferred embodiment of the present invention, the thrust washer 46 is made of a ductile STELLITE material with a room temperature yield strength of between 80,000 psi and 120,000 psi, a tensile elongation greater than 5%, and an un-notched longitudinal Charpy impact strength greater than 60 ft-lbs. at room temperature. This wrought chromium carbide and cobalt containing material typically has a minimum yield strength of less than 100,000 psi at room temperature.

The same thrust washer 46 has an un-notched longitudinal Charpy impact strength of greater than 120 ft-lbs., a yield strength greater than 30,000 psi, and a tensile elongation greater than 10% at 1500 degrees F. Bearing surface asperity temperatures of 1500 degrees F. can occur in a rock bit drilling in a severe application.

A thrust washer 46 made of ductile STELLITE material provides superior performance when run in these extreme conditions, when prior art drill bit thrust systems fail. In the preferred embodiment, the thrust washer 46 is made from Aerospace Material Specification AMS 5894, commercially available as grade 6B wrought STELLITE from Del Oro STELLITE, Ontario, Canada. Several hundred drill bits have been satisfactorily tested with thrust washers 46 made with this material.

Although a variety of diameters and thicknesses of the thrust washer 46 were tested with equal effectiveness, a thickness of 0.070" proved to be optimum when manufacturing ease, design space, fit and strength are considered. To assure proper fit, both surfaces of the thrust washer were finished to within 0.0005" parallelism and 0.0005" flatness. The surface finish of the floating washer can be smooth or rough as desired, although it is desirable to have an initial roughness of about 10 micro-inches Ra.

It is also desired that the diametric clearance between the outside diameter of the thrust washer 46 and the mating cavity 50 in the cutter 18 be less than the diametric clearance between the inside diameter of the thrust washer 46 and the pin 48 of the bearing spindle 16. This OD trapping of the washer 46 in the cutter 18 causes the thrust washer 46 to lock within the cutter 18 during extreme load peaks. During these load events, degradation of the thrust washer 46 is minimized because once it locks into the cutter 18, it rotates with the cutter 18, spreading the load over a greater portion of the surface of the thrust washer 46. When the peak load event is over, the thrust washer 46 returns to normal floating operation.

STELLITES in general tend to have higher coefficients of friction against steels than other bearing materials. To compensate for this, the ductile STELLITE bearing material may be coated with a soft metallic solid lubricant. Many types of lubricants are suitable and include lead, indium, silver, gold, copper and alloys thereof. These lubricants can be applied to the STELLITE in a variety of ways including welding, plating, ion bombardment, D-gun, hot dipping, etc. In the preferred embodiment, a 0.0005" to 0.0015" thick silver layer is electroplated onto the surface of the ductile STELLITE thrust washer 46 to provide this solid lubrication.

Whereas the present invention has been described in particular relation to the drawings attached hereto, it should be understood that other and further modifications, apart from those shown or suggested herein, may be made within the scope and spirit of the present invention

What is claimed is:

1. A rolling cutter drill bit comprising a body and a plurality of legs, at least one of said legs having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength of less than 120,000 psi and a ductility of at least 5%, both at room temperature.

2. A drill bit according to claim 1, wherein said floating thrust bearing element has load carrying surfaces at least one of which is coated with one or more layers of soft metallic solid lubricant material.

3. A drill bit according to claim 1, wherein said soft metallic solid lubricant material is selected from the group of lead, indium, silver, gold, copper and alloys thereof.

4. A drill bit according to claim 3, wherein said load carrying surfaces of the floating thrust bearing element are electro-plated with a 0.0005" to 0.0015" thick layer of a silver solid lubricant material.

5. A drill bit according to claim 1, wherein said floating thrust bearing element has a thickness of about 0.070".

6. A drill bit according to claim 1, wherein said floating thrust bearing element is in the form of an annular disc received in an annular cavity in the rolling cutter and encircling a pin on said bearing spindle, the diametric clearance between the outer periphery of the annular disc and the cavity being less than the diametric clearance between the inner periphery of the annular disc and said pin.

7. A drill bit according to claim 1, wherein said lubricant delivering means comprise lubricant filled internal passageways within the bearing spindle, said passageways being in communication with a lubricant reservoir having a pressure balancing diaphragm.

8. A rolling cutter drill bit comprising a body and a plurality of legs, at least one of said legs having a cantilevered bearing spindle, a rolling cutter rotatably mounted on the bearing spindle, lubricant delivering means within the bearing spindle, and a separate bearing element configured to carry loads between the rolling cutter and said bearing spindle, said bearing element being formed of a wrought alloy material consisting primarily of chromium carbide and cobalt and having a yield strength of less than 120,000 psi and a ductility of at least 5%, both at room temperature.

9. A drill bit according to claim 8, wherein the yield strength of said floating thrust bearing element is less than 100,000 psi at room temperature.

10. A drill bit according to claim 8, wherein the yield strength of said floating thrust hearing element lies in the range of 80,000 to 120,000 psi at room temperature.

11. A drill bit according to claim 8, wherein the yield strength of said floating thrust bearing element is about 105,000 psi at room temperature.

12. A drill bit according to claim 8, wherein the yield strength of said floating thrust bearing element is about 80,000 psi at room temperature.

13. A drill bit according to claim 8, wherein said floating thrust bearing element has a yield strength greater than about 30,000 psi at 1500 degrees F.

14. A drill bit according to claim 8, wherein said floating thrust bearing element has a tensile elongation greater than 10% at 1500 degrees F.

15. A drill bit according to claim 8, wherein said floating thrust bearing element has an unnotched Charpy impact strength greater than 120 ft-lbs at 1500 degrees F.

16. A drill bit according to claim 8, wherein said floating thrust bearing element has an unnotched Charpy impact strength greater than 60 ft-lbs at room temperature.

17. A drill bit according to claim 8, wherein the floating thrust bearing element is formed from a material in accordance with Aerospace Material Specification AMS 5894.

18. A rolling cutter drill bit according to claim 8, wherein said separate bearing element is a floating bearing element configured to carry loads from the rolling cutter onto said bearing spindle.

19. A rolling cutter drill bit comprising a body and a plurality of legs, at least one of said having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength in the range of 80,000 to 120,000 psi and a ductility of at least 4%, both at room temperature.

20. A rolling cutter drill bit comprising a body and a plurality of legs, at least one of said legs having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength of about 105,000 psi and a ductility of at least 4%, both at room temperature.

21. A rolling cutter drill bit comprising a body and a plurality of legs, at least one of said legs having a cantilevered bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength of about 80,000 psi and a ductility of at least 4%, both at room temperature.

22. A rolling cutter drill bit comprising a body and a plurality of legs, at least one of said legs having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength of less than 100,000 psi and a ductility of at least 4%, both at room temperature.

23. A rolling cutter drill bit comprising a body and a plurality of legs, at least one of said legs having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength of less than 120,000 psi and a ductility of at least 4%, both at room temperature, and a yield strength greater than about 30,000 psi at 1500 degrees F.

24. A rolling cutter drill bit comprising a body and a plurality of legs, at least one of said legs having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength of less than 120,000 psi and a ductility of at least 4%, both at room temperature, and a tensile elongation greater than 10% at 1500 degrees F.

25. A rolling cutter drill bit comprising a body and a plurality of legs, at least one of said legs having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, sid floating thrust bearing element being formed of a wrought alloy material consisting primarily of chromium carbide and cobalt and having a yield strength of less than 120,000 psi and a ductility of at least 4%, both at room temperature, and an un-notched Charpy impact strength greater than 120 ft-lbs at 1500 degrees F.

26. A rolling cutter drill bit comprising a body and a plurality of legs, at least one of said legs having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength of less than 120,000 psi and a ductility of at least 4%, both at room temperature, and an un-notched Charpy impact strength greater than 60 ft-lbs at room temperature.

27. A rolling cutter drill bit comprising a body and a plurality of legs, at least one of said legs having a cantilevered bearing spindle, a rolling cutter rotatably mounted on the bearing spindle, lubricant delivering means within the bearing spindle, and a floating thrust bearing element configured to carry onward thrust loads from the rolling cutter onto said bearing spindle, said floating thrust bearing element being formed of a wrought alloy material consisting primarily of chromium carbide and cobalt and having a yield strength of less than 120,000 psi and a ductility of at least 4%, both at room temperature and being formed from a material in accordance with Aerospace Material Specification AMS 5894.

* * * * *